(12) United States Patent
Hall et al.

(10) Patent No.: US 10,545,222 B2
(45) Date of Patent: Jan. 28, 2020

(54) LIDAR DATA ACQUISITION AND CONTROL

(71) Applicant: Velodyne Lidar, Inc., Mogan Hill, CA (US)

(72) Inventors: David S. Hall, San Jose, CA (US); Raymond Liou, Cupertino, CA (US); Oren Milgrome, Richmond, CA (US); Anand Gopalan, Foster City, CA (US); Pravin Kumar Venkatesan, Fremont, CA (US)

(73) Assignee: Velodyne Lidar, Inc., Milpitas, CA (US)

(*) Notice: Subject to any disclaimer, the term of this patent is extended or adjusted under 35 U.S.C. 154(b) by 0 days.

(21) Appl. No.: 15/974,527

(22) Filed: May 8, 2018

(65) Prior Publication Data

US 2018/0321360 A1 Nov. 8, 2018

Related U.S. Application Data

(60) Provisional application No. 62/503,237, filed on May 8, 2017.

(51) Int. Cl.
*G01S 7/481* (2006.01)
*G01S 7/486* (2006.01)
*G01S 7/487* (2006.01)
*G01S 17/42* (2006.01)

(52) U.S. Cl.
CPC ........... *G01S 7/4811* (2013.01); *G01S 7/4865* (2013.01); *G01S 7/4876* (2013.01); *G01S 17/42* (2013.01)

(58) Field of Classification Search
CPC .... G01S 7/4811; G01S 7/4861; G01S 7/4865; G01S 7/487; G01S 17/10; G01S 17/105
See application file for complete search history.

(56) References Cited

U.S. PATENT DOCUMENTS

| | | | |
|---|---|---|---|
| 7,623,222 B2 * | 11/2009 | Benz | G01S 7/4861 356/4.1 |
| 7,969,558 B2 | 6/2011 | Hall | |
| 8,675,181 B2 | 3/2014 | Hall | |
| 8,767,190 B2 | 7/2014 | Hall | |
| 9,110,154 B1 * | 8/2015 | Bates | G01S 7/497 |
| 9,453,914 B2 * | 9/2016 | Stettner | G01S 17/107 |
| 2007/0121095 A1 * | 5/2007 | Lewis | G01S 7/4813 356/5.01 |

(Continued)

*Primary Examiner* — Eric L Bolda
(74) *Attorney, Agent, or Firm* — Goodwin Procter LLP

(57) ABSTRACT

Methods and systems for performing three dimensional LIDAR measurements with an integrated LIDAR measurement device are described herein. In one aspect, a return signal receiver generates a pulse trigger signal that triggers the generation of a pulse of illumination light and data acquisition of a return signal, and also triggers the time of flight calculation by time to digital conversion. In addition, the return signal receiver also estimates the width and peak amplitude of each return pulse, and samples each return pulse waveform individually over a sampling window that includes the peak amplitude of each return pulse waveform. In a further aspect, the time of flight associated with each return pulse is estimated based on a coarse timing estimate and a fine timing estimate. In another aspect, the time of flight is measured from the measured pulse due to internal optical crosstalk and a valid return pulse.

21 Claims, 12 Drawing Sheets

(56) References Cited

U.S. PATENT DOCUMENTS

| | | | |
|---|---|---|---|
| 2011/0211188 A1* | 9/2011 | Juenemann | G01S 7/4811 356/4.01 |
| 2013/0258312 A1* | 10/2013 | Lewis | G01S 17/10 356/4.01 |
| 2015/0116695 A1* | 4/2015 | Bartolome | G01S 17/10 356/5.05 |
| 2016/0365846 A1* | 12/2016 | Wyland | G01S 17/105 |
| 2018/0106902 A1* | 4/2018 | Mase | G01C 3/06 |

\* cited by examiner

LIDAR DATA ACQUISITION AND CONTROL

CROSS REFERENCE TO RELATED APPLICATION

The present application for patent claims priority under 35 U.S.C. § 119 from U.S. provisional patent application Ser. No. 62/503,237, entitled "LIDAR Data Acquisition And Control," filed May 8, 2017, the subject matter of which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Some existing LIDAR systems employ an illumination source and a detector that are not integrated together onto a common substrate (e.g., electrical mounting board). Furthermore, the illumination beam path and the collection beam path are separated within the LIDAR device. This leads to opto-mechanical design complexity and alignment difficulty.

In addition, mechanical devices employed to scan the illumination beams in different directions may be sensitive to mechanical vibrations, inertial forces, and general environmental conditions. Without proper design these mechanical devices may degrade leading to loss of performance or failure.

To measure a 3D environment with high resolution and high throughput, the measurement pulses must be very short. Current systems suffer from low resolution because they are limited in their ability to generate short duration pulses and resolve short duration return pulses.

Saturation of the detector limits measurement capability as target reflectivity and proximity vary greatly in realistic operating environments. In addition, power consumption may cause overheating of the LIDAR system.

Light devices, targets, circuits, and temperatures vary in actual systems. The variability of all of these elements limits system performance without proper calibration of the signals detected from each LIDAR device.

Improvements in the illumination drive electronics and receiver electronics of LIDAR systems are desired to improve imaging resolution and range.

SUMMARY

Methods and systems for performing three dimensional LIDAR measurements with an integrated LIDAR measurement device are described herein.

In one aspect, a return signal receiver of a LIDAR measurement device generates a pulse trigger signal that causes an illumination driver to provide electrical power to an illumination source, which causes the illumination source to generate a pulse of illumination light. In addition, the pulse trigger signal directly triggers data acquisition of a return signal and associated time of flight calculation. In this manner, the pulse trigger signal is employed to trigger both pulse generation and return pulse data acquisition. This ensures precise synchronization of pulse generation and return pulse acquisition which enables precise time of flight calculations by time-to-digital conversion.

In another aspect, the return signal receiver identifies one or more return pulses of light reflected from one or more objects in the surrounding environment in response to the pulse of illumination light and determines a time of flight associated with each of the return pulses. The return signal receiver also estimates a width of each return pulse, a peak amplitude of each return pulse, and samples each return pulse waveform individually over a sampling window that includes the peak amplitude of each return pulse waveform. These signal properties and timing information are communicated from the integrated LIDAR measurement device to a master controller.

In a further aspect, the time of flight associated with each return pulse is estimated by the return signal receiver based on a coarse timing module and a fine timing module. In a further aspect, a metastability bit is employed to determine the correct count of the coarse timing module when a hit signal comes in near a clock transition. The value of the metastability bit determines whether the hit signal came in near a high to low transition of the counter signal, or a low to high transition of the counter signal, and thus the correct count value.

In another further aspect, the return pulse receiver IC measures time of flight based on the time elapsed between the detection of a pulse due to internal cross-talk between the illumination source and the photodetector of the integrated LIDAR measurement device and a valid return pulse. In this manner, systematic delays are eliminated from the estimation of time of flight.

In another aspect, a master controller is configured to generate a plurality of pulse command signals, each communicated to a different integrated LIDAR measurement device. Each return pulse receiver IC generates a corresponding pulse trigger signal based on the received pulse command signal.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
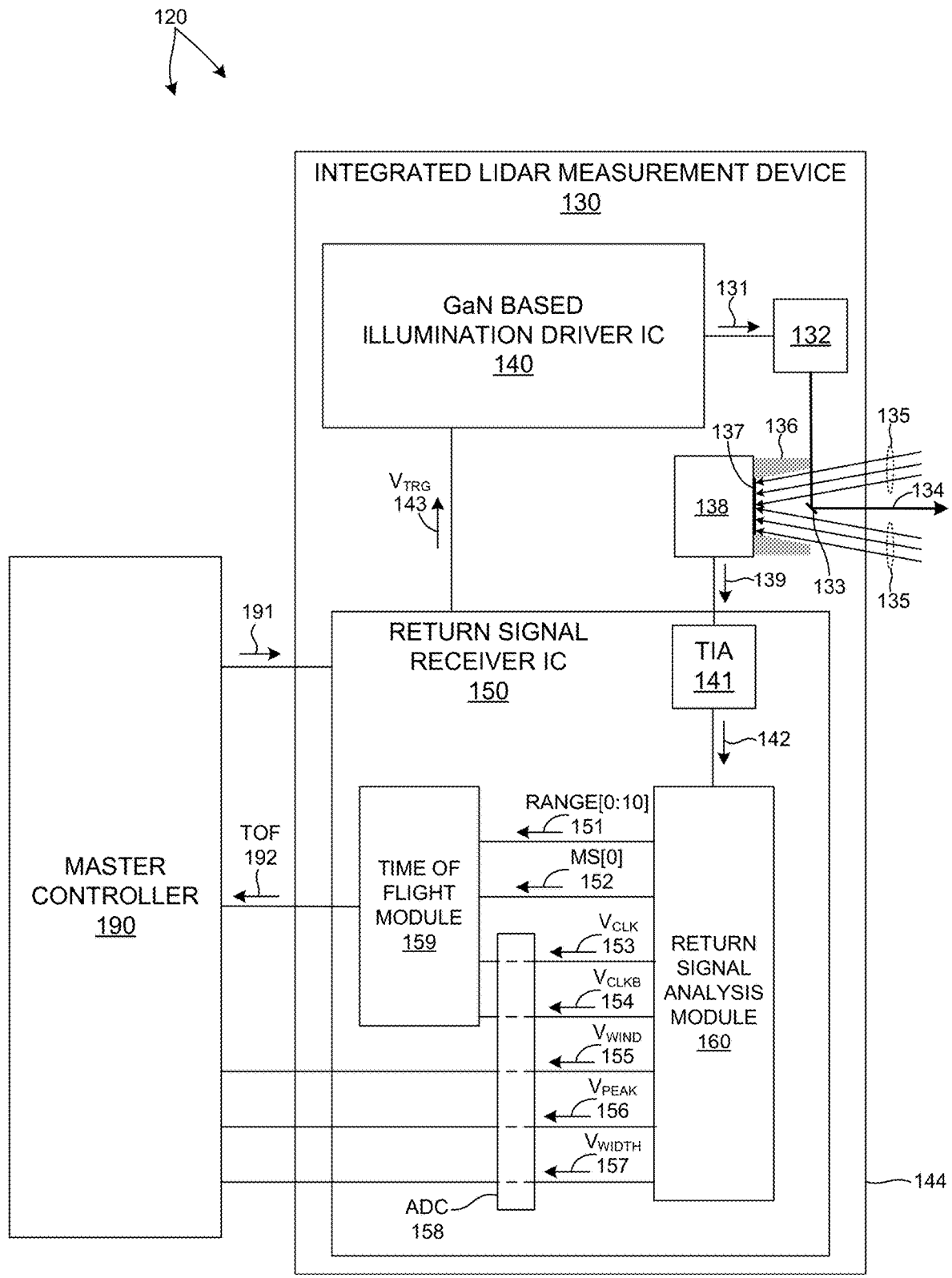
FIG. 1 is a simplified diagram illustrative of one embodiment of a LIDAR measurement system including at least on integrated LIDAR measurement device in at least one novel aspect.

FIG. 1 depicts a LIDAR measurement system 120 in one embodiment. LIDAR measurement system 120 includes a master controller 190 and one or more integrated LIDAR measurement devices 130. An integrated LIDAR measurement device 130 includes a return signal receiver integrated circuit (IC) 150, a Gallium Nitride based illumination driver integrated circuit (IC) 140, an illumination source 132, a photodetector 138, and a trans-impedance amplifier (TIA) 141. Each of these elements is mounted to a common substrate 144 (e.g., printed circuit board) that provides mechanical support and electrical connectivity among the elements.

In addition, in some embodiments, an integrated LIDAR measurement device includes one or more electrical power supplies that provide electrical power to the electronic elements mounted to substrate 144 and electrical power to the illumination device 132. The electrical power supplies may be configured to supply any suitable voltage or current. In some embodiments, one or more of the electrical power supplies are mounted to substrate 144. However, in general, any of the electrical power supplies described herein may be mounted to a separate substrate and electrically coupled to the various elements mounted to substrate 144 in any suitable manner.

Master controller 190 is configured to generate a pulse command signal 191 that is communicated to receiver IC 150 of integrated LIDAR measurement device 130. In general, a LIDAR measurement system includes a number of different integrated LIDAR measurement devices 130. In these embodiments, master controller 190 communicates a distinct pulse command signal 191 to each different integrated LIDAR measurement device. In this manner, master controller 190 coordinates the timing of LIDAR measurements performed by any number of integrated LIDAR measurement devices.

Pulse command signal 191 is a digital signal generated by master controller 190. Thus, the timing of pulse command signal 191 is determined by a clock associated with master controller 190. In some embodiments, the pulse command signal 191 is directly used to trigger pulse generation by illumination driver IC 140 and data acquisition by receiver IC 150. However, illumination driver IC 140 and receiver IC 150 do not share the same clock as master controller 190. For this reason, precise estimation of time of flight becomes much more computationally tedious when pulse command signal 191 is directly used to trigger pulse generation and data acquisition.

In one aspect, receiver IC 150 receives pulse command signal 191 and generates a pulse trigger signal, $V_{TRG}$ 143, in response to the pulse command signal 191. Pulse trigger signal 143 is communicated to illumination driver IC 140 and directly triggers illumination driver IC 140 to provide an electrical pulse 131 to illumination source 132, which causes illumination source 132 to generate a pulse of illumination light 134. In addition, pulse trigger signal 143 directly triggers data acquisition of return signal 142 and associated time of flight calculation. In this manner, pulse trigger signal 143 generated based on the internal clock of receiver IC 150 is employed to trigger both pulse generation and return pulse data acquisition. This ensures precise synchronization of pulse generation and return pulse acquisition which enables precise time of flight calculations.

Illumination source 132 emits a measurement pulse of illumination light 134 in response to a pulse of electrical energy 131. The illumination light 134 is focused and projected onto a particular location in the surrounding environment by one or more optical elements of the LIDAR system.

In some embodiments, the illumination source 132 is laser based (e.g., laser diode). In some embodiments, the illumination source is based on one or more light emitting diodes. In general, any suitable pulsed illumination source may be contemplated.

As depicted in FIG. 1, illumination light 134 emitted from integrated LIDAR measurement device 130 and corresponding return measurement light 135 reflected back toward integrated LIDAR measurement device 130 share a common optical path. Integrated LIDAR measurement device 130 includes a photodetector 138 having an active sensor area 137. As depicted in FIG. 1, illumination source 132 is located outside the field of view of the active area 137 of the photodetector. As depicted in FIG. 1, an overmold lens 136 is mounted over the photodetector 138. The overmold lens 136 includes a conical cavity that corresponds with the ray acceptance cone of return light 135. Illumination light 134 from illumination source 132 is injected into the detector reception cone by a fiber waveguide. An optical coupler optically couples illumination source 132 with the fiber waveguide. At the end of the fiber waveguide, a mirror element 133 is oriented at an angle (e.g., 45 degrees) with respect to the waveguide to inject the illumination light 134 into the cone of return light 135. In one embodiment, the end faces of the fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 134 into the acceptance cone of return light 135 with minimal occlusion.

The placement of the waveguide within the acceptance cone of the return light 135 projected onto the active sensing area 137 of detector 138 is selected to ensure that the illumination spot and the detector field of view have maximum overlap in the far field.

As depicted in FIG. 1, return light 135 reflected from the surrounding environment is detected by photodetector 138. In some embodiments, photodetector 138 is an avalanche photodiode. Photodetector 138 generates an output signal 139 that is communicated to return signal receiver IC 150.

Output signal 139 is received and amplified by TIA 141. The amplified signal 142 is communicated to return signal analysis module 160. In general, the amplification of output signal 139 may include multiple, amplifier stages. In this sense, an analog trans-impedance amplifier is provided by way of non-limiting example, as many other analog signal amplification schemes may be contemplated within the scope of this patent document. Although TIA 141 is integrated with return signal receiver IC 150 as depicted in FIG. 1, in general, TIA 141 may be implemented as a discrete device separate from the receiver IC 150. In some embodiments, it is preferable to integrate TIA 141 with receiver IC 150 to save space and reduce signal contamination.

Return signal receiver IC 150 performs several functions. In one aspect, receiver IC 150 identifies one or more return pulses of light reflected from one or more objects in the surrounding environment in response to the pulse of illumination light 134, and determines a time of flight associated with each of these return pulses. In general, the output signal 139 is processed by return signal receiver IC 150 for a period of time that corresponds with the time of flight of light from the LIDAR measurement device 130 to a distance equal to the maximum range of the device 130, and back to the device 130. During this period of time, the illumination pulse 134 may encounter several objects at different distances from the integrated LIDAR measurement device 130. Thus, output signal 139 may include several pulses, each corresponding to a portion of the illumination beam 134 reflected from different reflective surfaces located at different distances from device 130. In another aspect, receiver IC 150 determines various properties of each of the return pulses. As depicted in FIG. 1, receiver IC 150 determines an indication of a width of each return pulse, determines the peak amplitude of each return pulse, and samples each return pulse waveform individually over a sampling window that includes the peak amplitude of each return pulse waveform. These signal properties and timing information are communicated from integrated LIDAR measurement device 130 to master controller 190. Master controller 190 may further process this data, or communicate this data directly to an external computing device for further image processing (e.g., by a user of the LIDAR measurement system 120).

Figure 2:
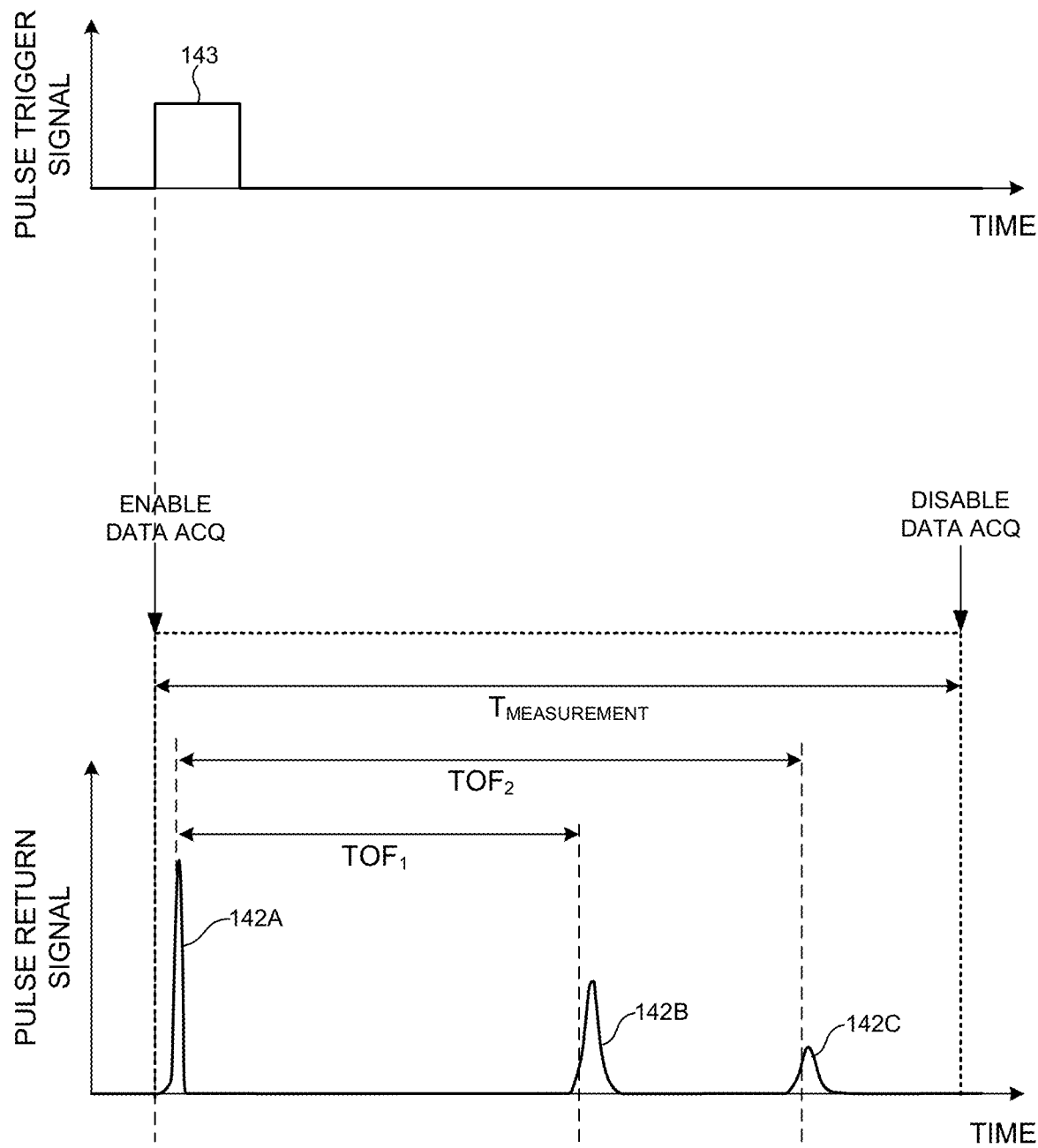
FIG. 2 depicts an illustration of the timing associated with the emission of a measurement pulse from an integrated LIDAR measurement device 130 and capture of returning measurement pulses.

FIG. 2 depicts an illustration of the timing associated with the emission of a measurement pulse from an integrated LIDAR measurement device 130 and capture of the returning measurement pulse(s). As depicted in FIG. 2, a measurement is initiated by the rising edge of pulse trigger signal 134 generated by receiver IC 150. As depicted in FIGS. 1 and 2, an amplified, return signal 142 is generated by TIA 141. As described hereinbefore, a measurement window (i.e., a period of time over which collected return signal data is associated with a particular measurement pulse) is initiated by enabling data acquisition at the rising edge of pulse trigger signal 143. Receiver IC 150 controls the duration of the measurement window, $T_{measurement}$, to correspond with the window of time when a return signal is expected in response to the emission of a measurement pulse sequence. In some examples, the measurement window is enabled at the rising edge of pulse trigger signal 143 and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 142 includes three return measurement pulses that correspond with the emitted measurement pulse. In general, signal detection is performed on all detected measurement pulses. In one example, signal analysis may be performed to identify the closest valid signal 142B (i.e., first valid instance of the return measurement pulse), the strongest signal, and the furthest valid signal 142C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 143 and each valid return pulse (i.e., 142B and 142C) introduces undesirable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In another aspect, receiver IC 150 measures time of flight based on the time elapsed between the detection of a detected pulse 142A due to internal cross-talk between the illumination source 132 and photodetector 138 and a valid return pulse (e.g., 142B and 142C). In this manner, systematic delays are eliminated from the estimation of time of flight. Pulse 142A is generated by internal cross-talk with effectively no distance of light propagation. Thus, the delay in time from the rising edge of the pulse trigger signal and the instance of detection of pulse 142A captures all of the systematic delays associated with illumination and signal detection. By measuring the time of flight of valid return pulses (e.g., return pulses 142B and 142C) with reference to detected pulse 142A, all of the systematic delays associated with illumination and signal detection due to internal cross-talk are eliminated. As depicted in FIG. 2, receiver IC 150 estimates the time of flight, $TOF_1$, associated with return pulse 142B and the time of flight, $TOF_2$, associated with return pulse 142C with reference to return pulse 142A.

In some embodiments, the signal analysis is performed by receiver IC 150, entirely. In these embodiments, time of flight signals 192 communicated from integrated LIDAR measurement device 130 include an indication of the time of flight of each return pulse determined by receiver IC 150. In some embodiments, signals 155-157 include waveform information associated with each return pulse generated by receiver IC 150. This waveform information may be processed further by one or more processors located on board the 3-D LIDAR system, or external to the 3-D LIDAR system to arrive at another estimate of distance, an estimate of one or more physical properties of the detected object, or a combination thereof.

Return signal receiver IC 150 is a mixed analog/digital signal processing IC. In the embodiment depicted in FIG. 1, return signal receiver IC 150 includes TIA 141, a return signal analysis module 160, a time of flight calculation module 159, and an analog to digital conversion module 158.

Figure 3:
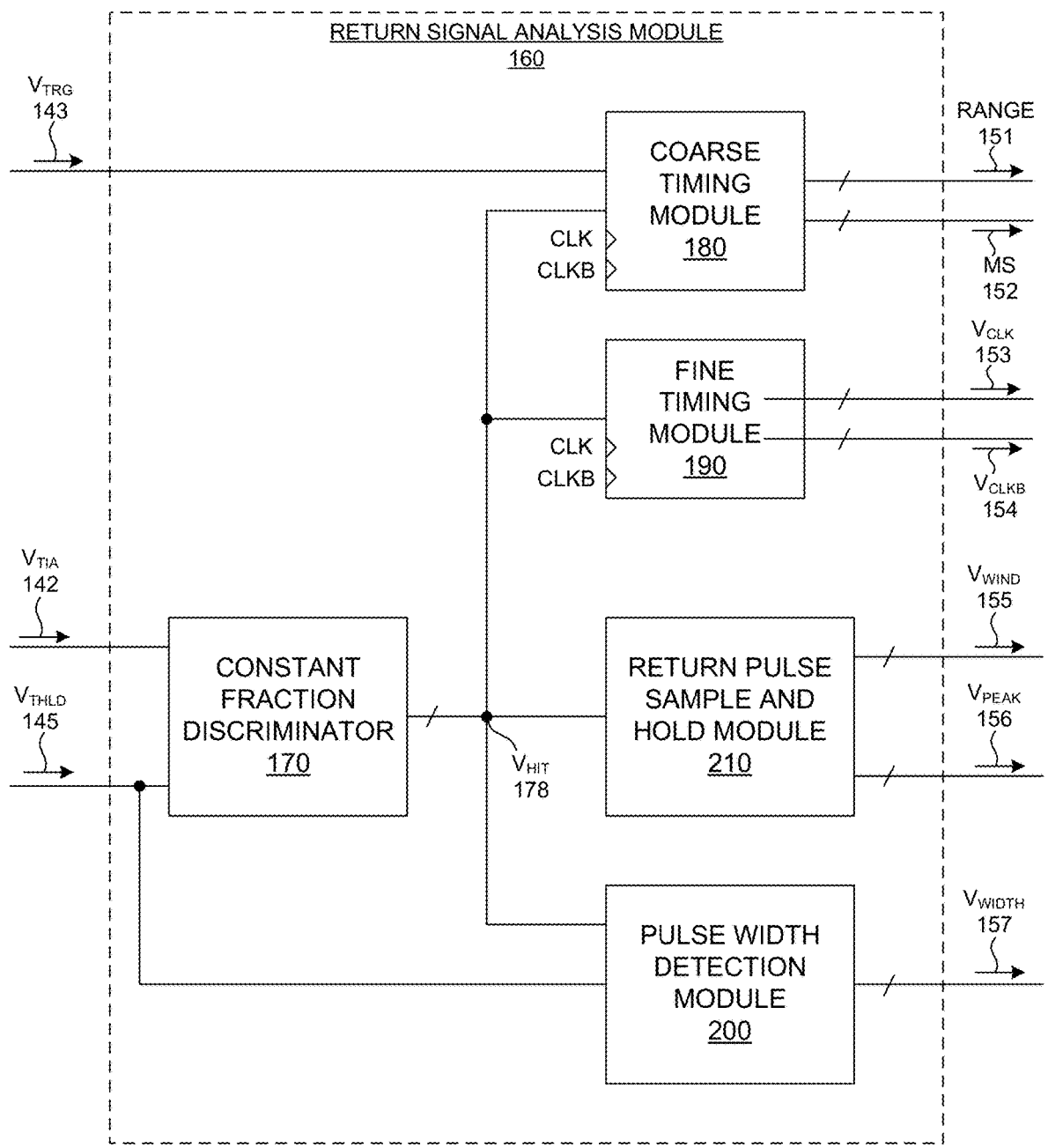
FIG. 3 depicts a simplified diagram illustrative of one embodiment of a portion of a return signal receiver IC including a return signal analysis module 160 in one embodiment.

FIG. 3 depicts return signal analysis module 160 in one embodiment. In the embodiment depicted in FIG. 3, return signal analysis module 160 includes constant fraction discriminator (CFD) circuitry 170, a coarse timing module 180, a fine timing module 190, a pulse width detection module 200, and a return pulse sample and hold module 210.

Amplified return signal, $V_{TIA}$ 142, and threshold signal, $V_{THLD}$ 145, are received by CFD 170. CFD 170 identifies a valid return pulse when return signal 142 exceeds a threshold value (i.e., the value of threshold signal 145). In addition, CFD 170 repeatably determines when a valid return pulse is detected and generates a hit signal, $V_{HIT}$ 178, that sharply transitions at the time of detection. Hit signal 178 signals the detection of a valid return pulse and triggers each of the timing and waveform acquisition and analysis functions of return signal analysis module 160.

For example, coarse timing module 180 determines a digital signal (i.e., range 151) indicative of the number of digital clock cycles that have elapsed from a transition of the pulse trigger signal 143 that triggers illumination pulse 134 and the transition of hit signal 178 associated with a particular valid return pulse. Coarse timing module 180 also generates a digital signal (i.e., MS 152) that is the digital clock signal time shifted by half of the period of the digital clock signal.

In addition, fine timing module 190 determines an analog signal (i.e., $V_{CLK}$ 153) having a voltage value indicative of a time elapsed between the transition of hit signal 178 associated with a particular valid return pulse and the next transition of the digital clock signal, CLK. Similarly, fine timing module 190 determines an analog signal (i.e., $V_{CLKB}$ 154) having a voltage value indicative of a time elapsed between the transition of hit signal 178 associated with a particular valid return pulse and the next transition of the inverse of the digital clock signal, CLKB. Range 151, MS 152, $V_{CLK}$ 153, and $V_{CLKB}$ 154 are employed by time of flight module 159 to determine the time of flight associated with each detected return pulse.

Return pulse sample and hold module 210 generates an analog signal (i.e., $V_{PEAK}$ 156) having a signal value (e.g., voltage) indicative of a peak amplitude of each valid return pulse. In addition, return pulse sample and hold module 210 generates a set of analog signals (i.e., $V_{WIND}$ 155) each having a signal value (e.g., voltage) indicative of an amplitude associated with a sampling point of each valid return pulse waveform. In some embodiments, the number of sampling points before and after the peak amplitude of the waveform is programmable.

Pulse width detection module 200 generates an analog signal (i.e., $V_{WIDTH}$ 157) having a signal value (e.g., voltage) indicative of a width of each valid return pulse waveform. In the depicted embodiment, the value of $V_{WIDTH}$ 157 is indicative of the time elapsed between a time when return pulse signal 142 exceeds the value of $V_{THLD}$ 145 and the time of transition of hit signal 178 associated with a particular valid return pulse. $V_{WIND}$ 155, $V_{PEAK}$ 156, and $V_{WIDTH}$ 157 are each converted to digital signals by analog to digital converter (ADC) 158 of return signal receiver IC 150 before communication from return signal receiver IC to master controller 190.

Figure 4:
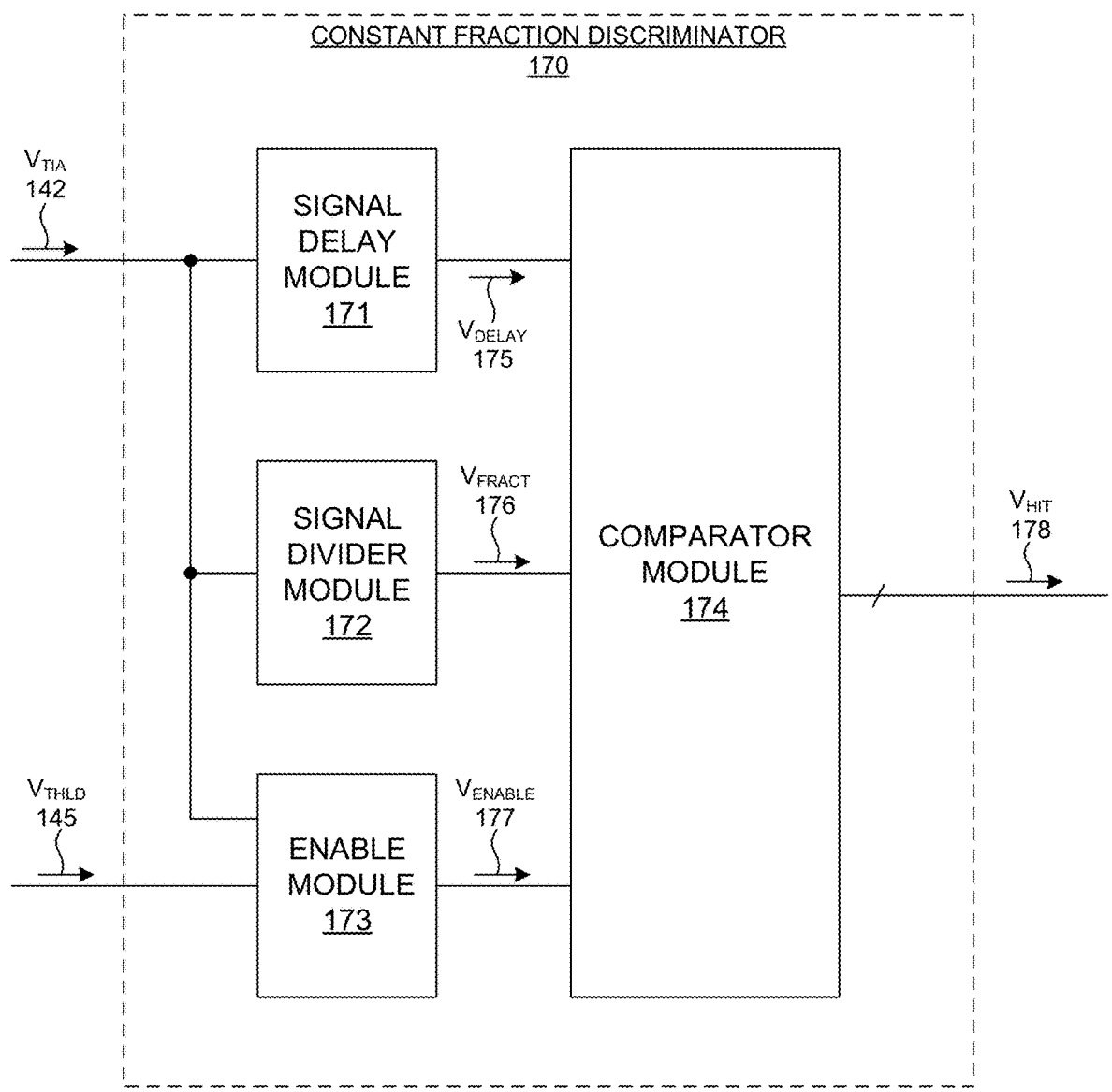
FIG. 4 depicts a simplified diagram illustrative of one embodiment of a portion of a return signal receiver IC including a constant fraction discriminator module 170 in one embodiment.

FIG. 4 depicts constant fraction discriminator 170 in one embodiment. As depicted in FIG. 4 constant fraction discriminator 170 includes signal delay module 171, signal divider module 172, enable module 173, and comparator module 174. Analog output signal 142 generated by TIA 141 is communicated to signal delay module 171, signal divider module 172, and enable module 173. Signal delay module 171 introduces a fixed delay to signal 142 and to generate $V_{DELAY}$ 175. At the same time signal divider module 172 includes a voltage divider circuit that divides $V_{TIA}$ 142 by a constant fraction (e.g., divide by 2) to generate $V_{FRACT}$ 176. The values of $V_{DELAY}$ 175 and $V_{FRACT}$ 176 are compared by comparator 174. In one example, hit signal, $V_{HIT}$ 178 is driven to a high state when $V_{DELAY}$ 175 is greater than $V_{FRACT}$ 176, and $V_{HIT}$ 178 is driven to a low state when $V_{DELAY}$ 175 is less than $V_{FRACT}$ 176. In this manner, $V_{HIT}$ 178 indicates when a return pulse has arrived and when it has passed in a consistent manner. If an arbitrary threshold value were employed to determine the arrival of a return pulse, the timing of the arrival would be inconsistent because different return pulses are not similarly shaped. However, by employing a constant fraction discriminator, the timing of the arrival and passing of return pulses is identified consistently among multiple return pulses. Enable module 173 receives a threshold voltage value, $V_{THLD}$ 145 and generates an enable signal, $V_{ENABLE}$ 177, when the value of return signal $V_{TIA}$ 142 exceeds $V_{THLD}$ 145. In this manner, comparator module 174 is enabled only when return signal 142 exceeds a threshold value. This ensures that spurious spikes in return signal 142 are ignored, and valid return pulses are processed by comparator module 174. In general, CFD 170 is configured to generate a hit signal 178 associated with each valid return pulse that arrives during a measurement window. Thus, $V_{HIT}$ 178 includes multiple hit signals, each associated with a different return pulse.

Figure 5:
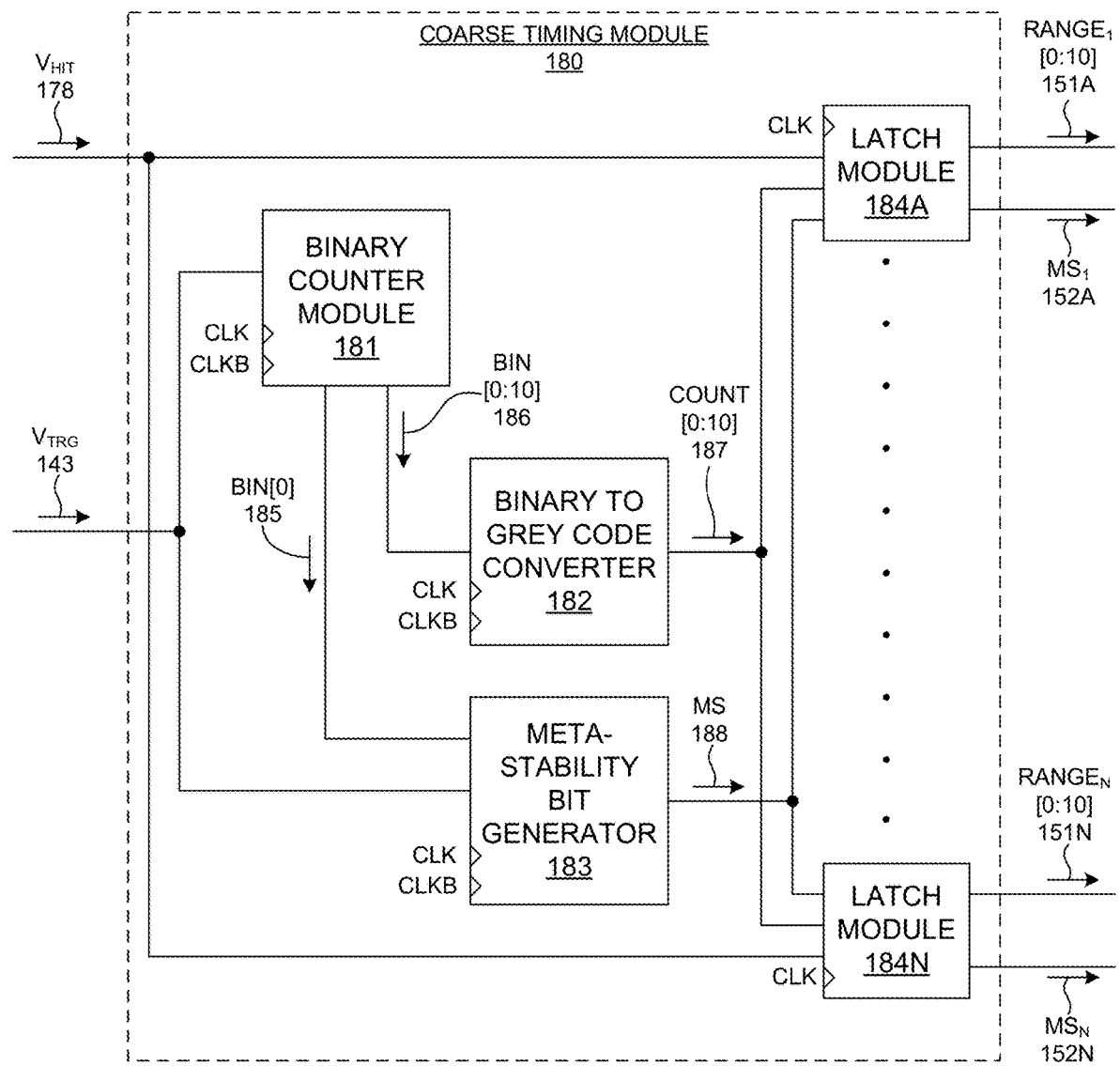
FIG. 5 depicts a simplified diagram illustrative of one embodiment of a portion of a return signal receiver IC including a coarse timing module in one embodiment.

FIG. 5 depicts an embodiment of coarse timing module 180. As depicted in FIG. 5, coarse timing module 180 includes a binary counter module 181, a binary code to grey code converter 182, a metastability bit generator 183, and one or more latch modules 184A-N. As depicted in FIG. 5, a digital clock signal, CLK, and the inverse of the digital clock signal, CLKB, are received by the modules of coarse timing module 180. In one embodiment, the digital clock signal is generated by a phase locked loop (PLL) on board return signal receiver IC 150. In one embodiment, the digital clock signal has a frequency of one gigahertz. Thus, in this particular embodiment, coarse timing module 180 is able to determine a time of flight associated with a particular return pulse to the nearest one nanosecond.

Binary counter module 181, receives pulse trigger signal 143 and begins counting in response to the pulse trigger. Digital signal BIN[0:10] 186 indicative of the running count is communicated to binary to grey code converter 182. Binary to grey code converter 182 converts the binary count signal BIN[0:10] 186 to a grey code equivalent digital signal COUNT[0:10]. COUNT[0:10] is communicated to each of the latch modules 184A-N. In addition, the first bit of running binary count BIN[0] is communicated to metastability bit generator 183. Metastability bit generator 183 generates metastability bit MS 188 by introducing a half period shift to BIN[0]. MS 188 is also communicated to each of the latch modules 184A-N.

In addition, each hit signal 178 associated with a different return pulse is communicated to a different latch module (i.e., one of latch modules 184A-N). Each of latch modules 184A-N latch the last known value of COUNT[0:10] and MS at the transition of the corresponding hit signal indicating the identification of a return pulse. The resulting latched values, RANGE[0:10] 151 and MS 152, respectively, are communicated to time of flight module 159 depicted in FIG. 1.

Figure 6:
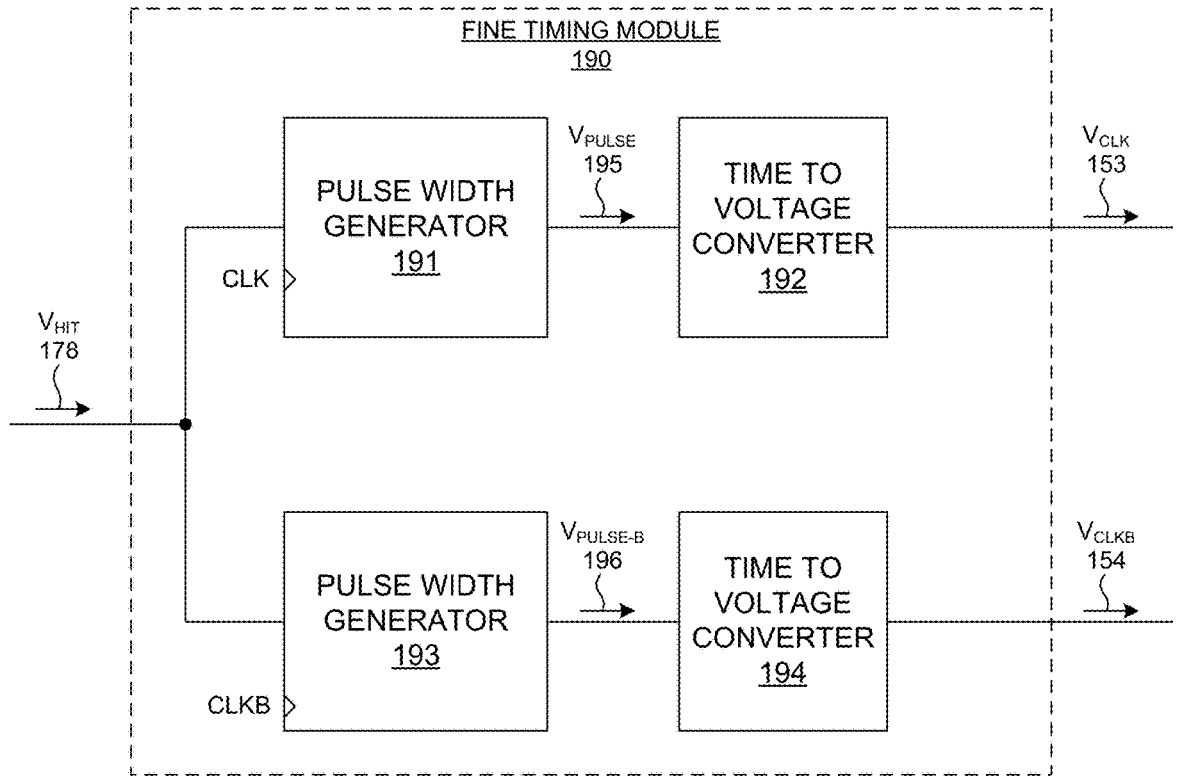
FIG. 6 depicts a simplified diagram illustrative of one embodiment of a portion of a return signal receiver IC including fine timing module in one embodiment.

FIG. 6 depicts fine timing module 190 in one embodiment. Fine timing module 190 includes two pulse width generators 191 and 193 and two time to voltage converters 192 and 194. Pulse width generator 191 receives each hit signal 178 and clock signal, CLK. Similarly, pulse width generator 193 receives each hit signal 178 and clock signal, CLKB. Pulse width generator 191 generates a pulse having a duration that matches the time between a rising edge of a hit signal 178 and the next rising edge of the clock signal, CLK. This pulse signal, $V_{PULSE}$ 195 is communicated to time to voltage converter 192. In response to $V_{PULSE}$ 195, time to voltage converter 192 generates a current ramp through a capacitor for the duration of the pulse. The voltage across the capacitor is indicative of the duration of the pulse. This voltage signal, $V_{CLK}$ 153 is communicated to ADC 158 for conversion to a digital signal, and onto time of flight module 159. Similarly, pulse width generator 193 generates a pulse having a duration that matches the time between a rising edge of a hit signal 178 and the next rising edge of the clock signal, CLKB. This pulse signal, $V_{PULSE-B}$ 196 is communicated to time to voltage converter 194. In response to $V_{PULSE-B}$ 196, time to voltage converter 194 generates a current ramp through a capacitor for the duration of the pulse. The voltage across the capacitor is indicative of the duration of the pulse. This voltage signal, $V_{CLKB}$ 154 is communicated to ADC 158 for conversion to a digital signal, and onto time of flight module 159. Since the pulse width generators 191 and 193 and time to voltage converters 192 and 194 are analog modules, the uncertainty associated with the estimate of time elapsed between the rising edge of a hit signal and the next clock signal is less than 10 picoseconds. Thus, the fine timing module enables a high precision estimate of the time of flight associated with a particular return pulse.

In another aspect, the determination of the time of flight associated with each return pulse is determined based on the output of both the coarse timing module and the fine timing module. In the embodiment depicted in FIG. 1, time of flight module 159 is implemented digitally. Time of flight module 159 determines the time of flight associated with a particular return pulse based on the coarse time estimate, RANGE[0:10], associated with that return pulse and the fine time estimate. Time of flight module 159 determines whether $V_{CLK}$ or $V_{CLKB}$ is used as the fine time estimate based on whether the hit signal came in near a transition of the CLK signal or the CLKB signal. For example, if the hit signal came in near a transition of the CLK signal, $V_{CLKB}$ will be used as the basis for the fine time estimate because the CLKB signal was stable at that time. Similarly, if the hit signal came in near a transition of the CLKB signal, $V_{CLK}$ will be used as the basis for the fine time estimate because the CLK signal was stable at that time. In one example, the estimated time of flight is the sum of the coarse time estimate and the selected fine time estimate.

In a further aspect, the metastability bit MS[0] is employed to determine the correct count of RANGE[0:10] when a hit signal comes in near a clock transition, and thus a transition of counter module 181. For example, if a hit signal 178 transitions near a transition of the counter 181, it is unclear which count is associated with that hit signal. For a 1 gigahertz clock, the error could be one count, or one nanosecond. In these scenarios, the value of the metastability bit is employed to resolve which count is associated with a particular hit. The value of the metastability bit determines whether the hit signal came in near a high to low transition of the counter signal, or a low to high transition of the counter signal, and thus the correct count value.

Figure 7:
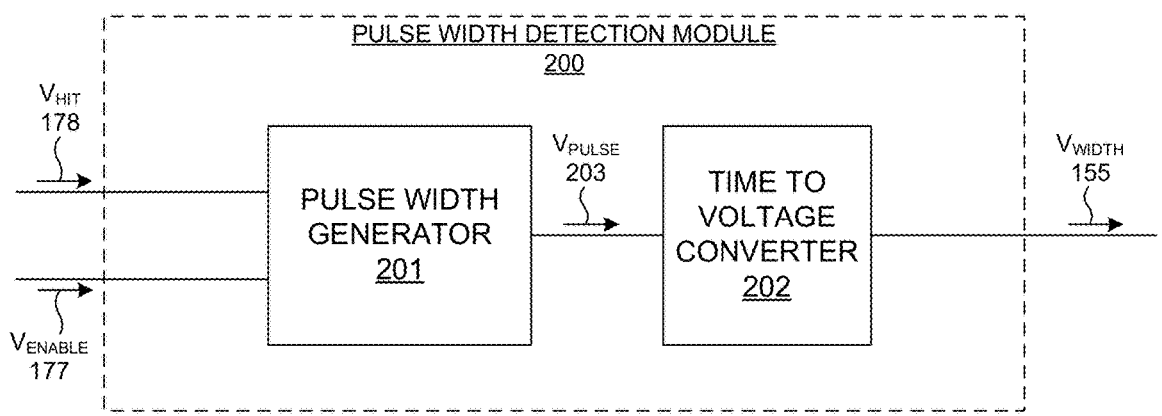
FIG. 7 depicts a simplified diagram illustrative of one embodiment of a portion of a return signal receiver IC including a pulse width detection module in one embodiment.

FIG. 7 depicts pulse width detection module 200 in one embodiment. Pulse width detection module 200 includes a pulse width generator 201 and a time to voltage converter 202. Pulse width generator 201 generates a pulse having a duration that matches the time between and a rising edge of enable signal, $V_{ENABLE}$ 177, depicted in FIG. 4, and a falling edge of a hit signal 178. This pulse signal, $V_{PULSE}$ 203 is communicated to time to voltage converter 202. In response to $V_{PULSE}$ 203, time to voltage converter 202 generates a current ramp through a capacitor for the duration of the pulse. The voltage across the capacitor is indicative of the duration of the pulse. This voltage signal, $V_{WIDTH}$ 155 is communicated to ADC 158 for conversion to a digital signal.

Pulse width detection module 200 is depicted by way of non-limiting example. In general, pulse width detection module 200 may be configured to operate on different input signals to generate $V_{PULSE}$ 203 and $V_{WIDTH}$ 155. In one example, pulse width generator 201 generates a pulse having a duration that matches the time between a rising edge of a hit signal 178 and a time when $V_{TIA}$ 142 falls below $V_{THLD}$ 145. The time when $V_{TIA}$ 142 falls below $V_{THLD}$ 145 may be determined by a separate comparator, or may be determined by the output of comparator module 174 without having the output latched like $V_{HIT}$. In another example, pulse width generator 201 generates a pulse having a duration that matches the time between a time when $V_{TIA}$ 142 rises above $V_{THLD}$ 145 and a time when $V_{TIA}$ 142 falls below $V_{THLD}$ 145. In one example, $V_{ENABLE}$ 177 is employed in lieu of pulse width generator 201, and $V_{ENABLE}$ 177 is provided as input to time to voltage converter 202. Time to voltage converter 202 generates a current ramp through a capacitor for the duration of the pulse. The voltage across the capacitor is indicative of the duration of the $V_{ENABLE}$ pulse.

In another aspect, a master controller is configured to generate a plurality of pulse command signals, each communicated to a different integrated LIDAR measurement device. Each return pulse receiver IC generates a corresponding pulse control signal based on the received pulse command signal.

Figure 8:
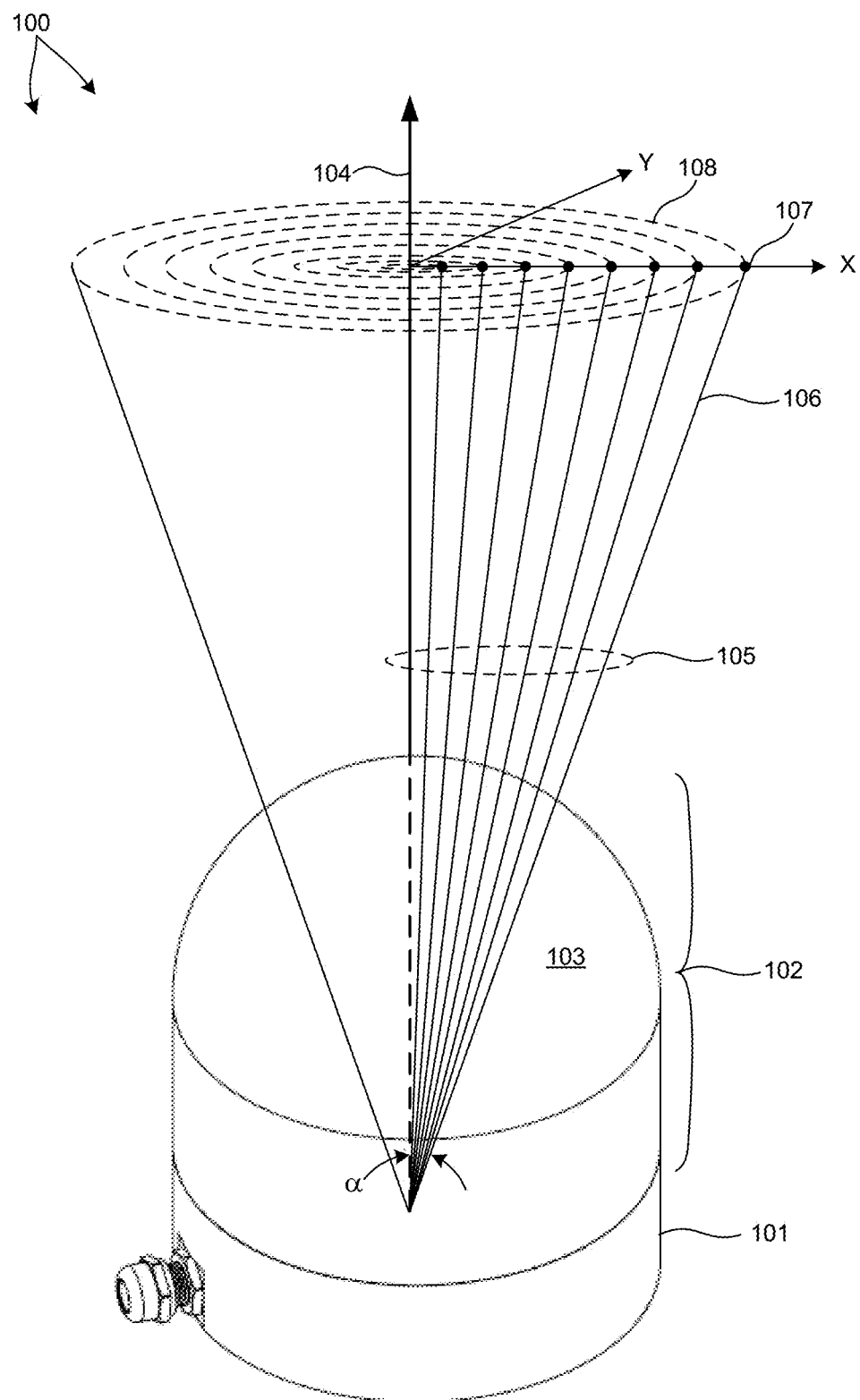
FIG. 8 is a diagram illustrative of an embodiment of a 3-D LIDAR system 100 in one exemplary operational scenario.
Figure 9:
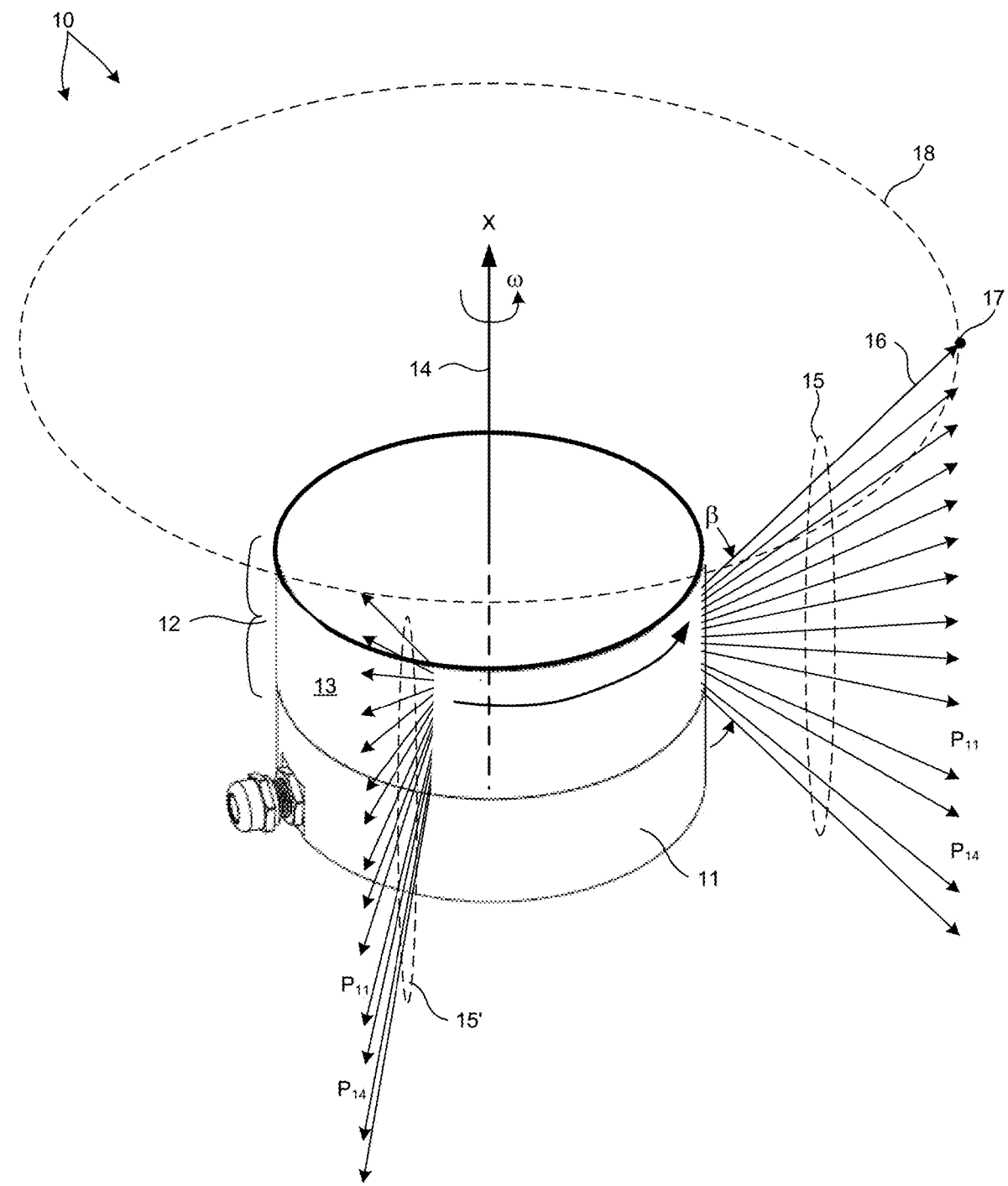
FIG. 9 is a diagram illustrative of another embodiment of a 3-D LIDAR system 10 in one exemplary operational scenario.
Figure 10:
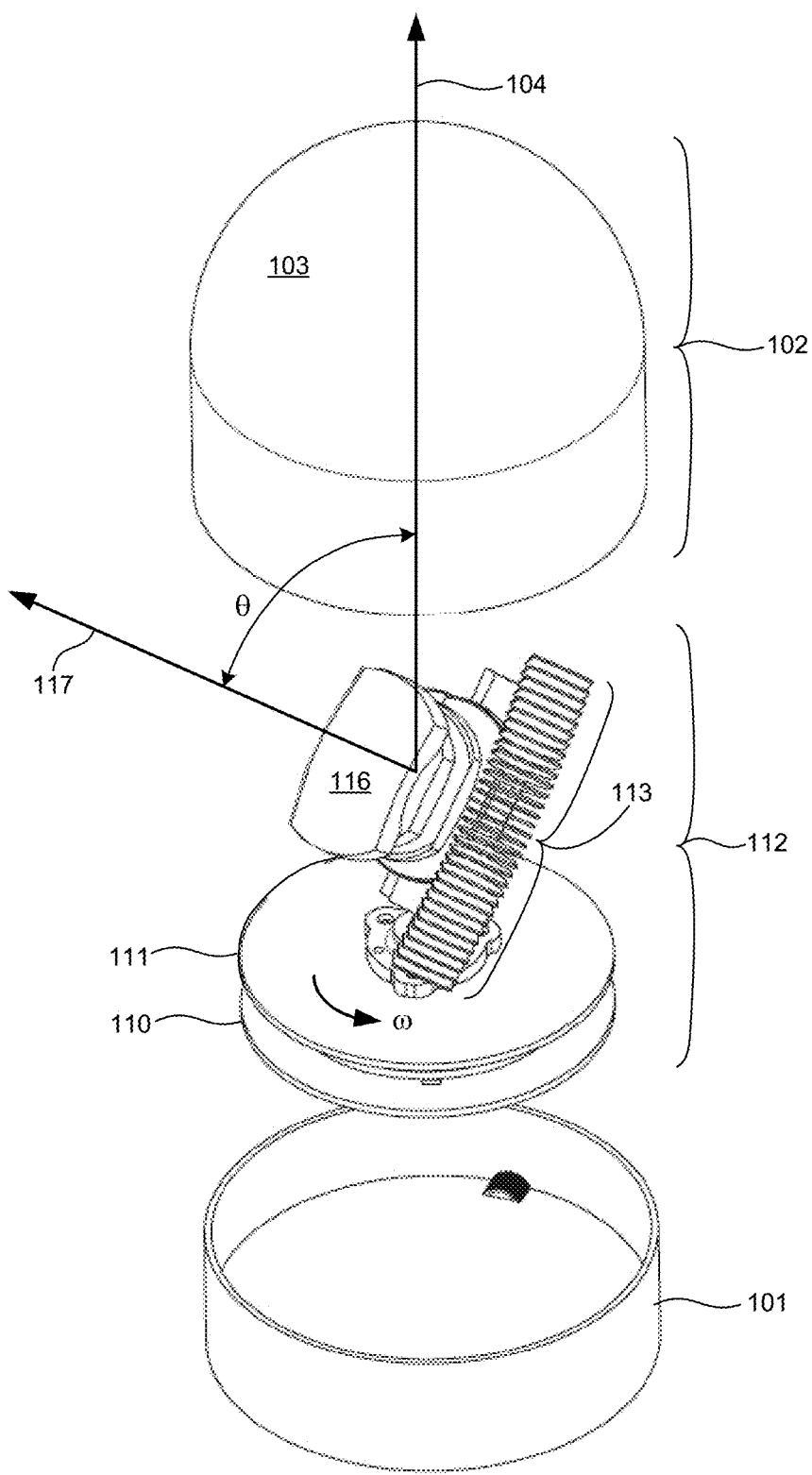
FIG. 10 depicts a diagram illustrative of an exploded view of 3-D LIDAR system 100 in one exemplary embodiment.

FIGS. 8-10 depict 3-D LIDAR systems that include multiple integrated LIDAR measurement devices. In some embodiments, a delay time is set between the firing of each integrated LIDAR measurement device. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

FIG. 8 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelengths centered at 905 nanometers.

As depicted in FIG. 8, a plurality of beams of light 105 are emitted from 3-D LIDAR system 100 through domed shell element 103 over an angular range, α, measured from a central axis 104. In the embodiment depicted in FIG. 8, each beam of light is projected onto a plane defined by the x and y axes at a plurality of different locations spaced apart from one another. For example, beam 106 is projected onto the xy plane at location 107.

In the embodiment depicted in FIG. 8, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, beam 106 projected onto the xy plane traces out a circular trajectory 108 centered about central axis 104.

FIG. 9 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 9, a plurality of beams of light 15 are emitted from 3-D LIDAR system 10 through cylindrical shell element 13 over an angular range, β. In the embodiment depicted in FIG. 9, the chief ray of each beam of light is illustrated. Each beam of light is projected outward into the surrounding environment in a plurality of different directions. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 9, 3-D LIDAR system 10 is configured to scan each of the plurality of beams of light 15 about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

FIG. 10 depicts an exploded view of 3-D LIDAR system 100 in one exemplary embodiment. 3-D LIDAR system 100 further includes a light emission/collection engine 112 that rotates about central axis 104. In the embodiment depicted in FIG. 10, a central optical axis 117 of light emission/collection engine 112 is tilted at an angle, θ, with respect to central axis 104. As depicted in FIG. 10, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer, capacitive, or optical elements, resulting in a contactless transmission of these signals. Light emission/collection engine 112 is fixedly positioned with respect to the rotating electronics board 111, and thus rotates about central axis 104 at the predetermined angular velocity, ω.

As depicted in FIG. 10, light emission/collection engine 112 includes an array of integrated LIDAR measurement devices 113. In one aspect, each integrated LIDAR measurement device includes a light emitting element, a light detecting element, and associated control and signal conditioning electronics integrated onto a common substrate (e.g., printed circuit board or other electrical circuit board).

Figure 11:
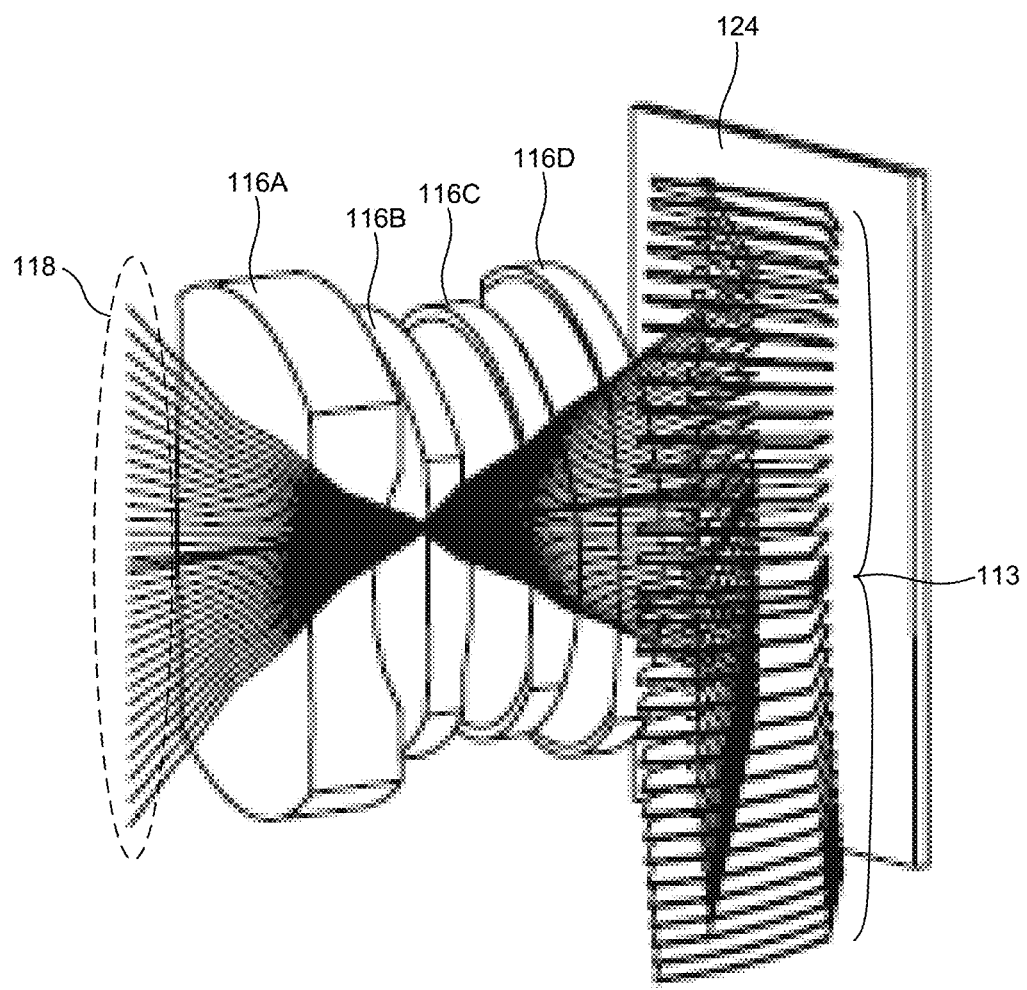
FIG. 11 depicts a view of optical elements 116 in greater detail.

Light emitted from each integrated LIDAR measurement device passes through a series of optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 11. In general, any number of LIDAR measurement devices can be arranged to simultaneously emit any number of light beams from 3-D LIDAR system 100. Light reflected from an object in the environment due to its illumination by a particular LIDAR measurement device is collected by optical elements 116. The collected light passes through optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

FIG. 11 depicts a view of optical elements 116 in greater detail. As depicted in FIG. 11, optical elements 116 include four lens elements 116A-D arranged to focus collected light 118 onto each detector of the array of integrated LIDAR measurement devices 113. In the embodiment depicted in FIG. 11, light passing through optics 116 is reflected from mirror 124 and is directed onto each detector of the array of integrated LIDAR measurement devices 113. In some embodiments, one or more of the optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

Figure 12:
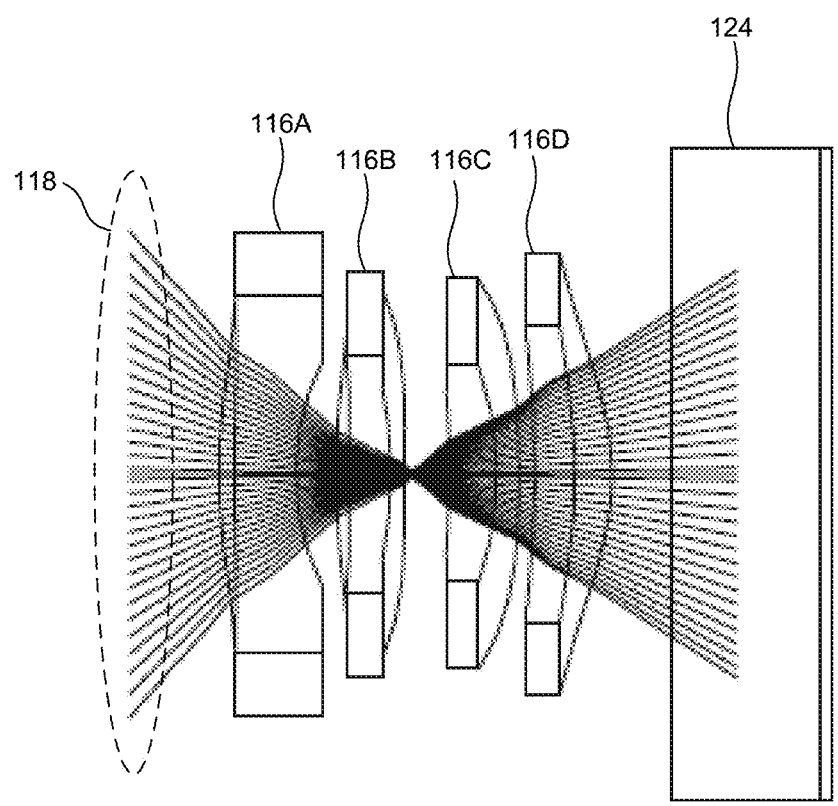
FIG. 12 depicts a cutaway view of optics 116 to illustrate the shaping of each beam of collected light 118.

FIG. 12 depicts a cutaway view of optics 116 to illustrate the shaping of each beam of collected light 118.

In this manner, a LIDAR system, such as 3-D LIDAR system 10 depicted in FIG. 9, and system 100, depicted in FIG. 8, includes a plurality of integrated LIDAR measurement devices each emitting a pulsed beam of illumination light from the LIDAR device into the surrounding environment and measuring return light reflected from objects in the surrounding environment.

In some embodiments, such as the embodiments described with reference to FIG. 8 and FIG. 9, an array of integrated LIDAR measurement devices is mounted to a rotating frame of the LIDAR device. This rotating frame rotates with respect to a base frame of the LIDAR device. However, in general, an array of integrated LIDAR measurement devices may be movable in any suitable manner (e.g., gimbal, pan/tilt, etc.) or fixed with respect to a base frame of the LIDAR device.

In some other embodiments, each integrated LIDAR measurement device includes a beam directing element (e.g., a scanning mirror, MEMS mirror etc.) that scans the illumination beam generated by the integrated LIDAR measurement device.

In some other embodiments, two or more integrated LIDAR measurement devices each emit a beam of illumination light toward a scanning mirror device (e.g., MEMS mirror) that reflects the beams into the surrounding environment in different directions.

In a further aspect, one or more integrated LIDAR measurement devices are in optical communication with an optical phase modulation device that directs the illumination beam(s) generated by the one or more integrated LIDAR measurement devices in different directions. The optical phase modulation device is an active device that receives a control signal that causes the optical phase modulation device to change state and thus change the direction of light diffracted from the optical phase modulation device. In this manner, the illumination beam(s) generated by the one or more integrated LIDAR devices are scanned through a number of different orientations and effectively interrogate the surrounding 3-D environment under measurement. The diffracted beams projected into the surrounding environment interact with objects in the environment. Each respective integrated LIDAR measurement device measures the distance between the LIDAR measurement system and the detected object based on return light collected from the object. The optical phase modulation device is disposed in the optical path between the integrated LIDAR measurement device and an object under measurement in the surrounding environment. Thus, both illumination light and corresponding return light pass through the optical phase modulation device.

Figure 13:
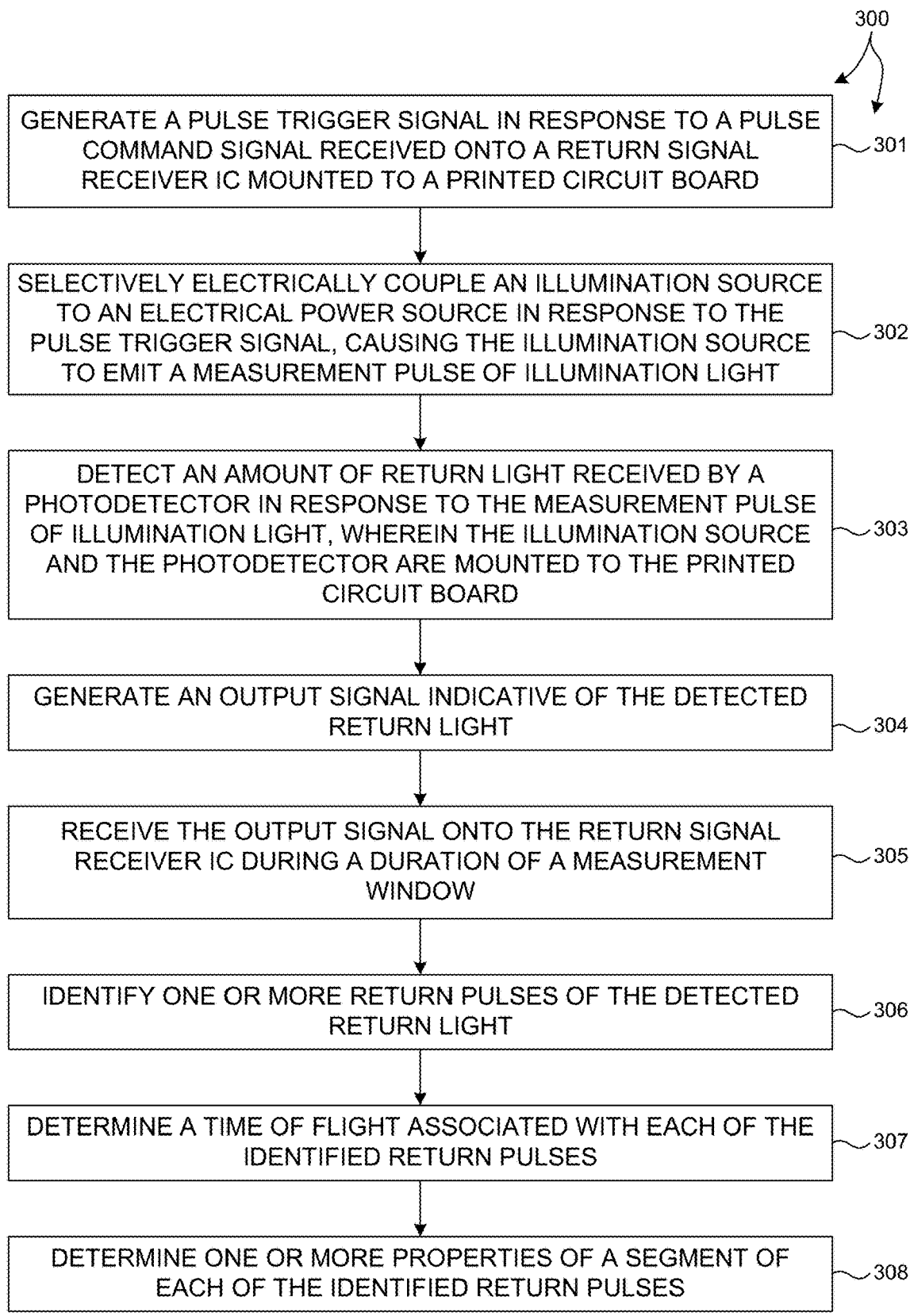
FIG. 13 depicts a flowchart illustrative of a method 300 of performing a LIDAR measurement by an integrated LIDAR measurement device in at least one novel aspect.

FIG. 13 illustrates a flowchart of a method 300 suitable for implementation by an integrated LIDAR measurement device as described herein. In some embodiments, integrated LIDAR measurement device 130 is operable in accordance with method 300 illustrated in FIG. 13. However, in general, the execution of method 300 is not limited to the embodiments of integrated LIDAR measurement device 130 described with reference to FIG. 1. These illustrations and corresponding explanation are provided by way of example as many other embodiments and operational examples may be contemplated.

In block 301, a pulse trigger signal is generated in response to a pulse command signal received onto a return signal receiver IC mounted to a printed circuit board.

In block 302, an illumination source is selectively electrically coupled to an electrical power source in response to the pulse trigger signal, causing the illumination source to emit a measurement pulse of illumination light.

In block 303, an amount of return light received by a photodetector is detected in response to the measurement pulse of illumination light. The illumination source and the photodetector are mounted to the printed circuit board.

In block 304, an output signal indicative of the detected return light is generated.

In block 305, the output signal is received onto the return signal receiver IC during a duration of a measurement window.

In block 306, one or more return pulses of the detected return light are identified.

In block 307, a time of flight associated with each of the identified return pulses is determined.

In block 308, one or more properties of a segment of each of the identified return pulses is determined.

A computing system as described herein may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over a transmission medium such as a wire, cable, or wireless transmission link. Program instructions are stored in a computer readable medium. Exemplary computer-readable media include read-only memory, a random access memory, a magnetic or optical disk, or a magnetic tape.

In general, any electrical power supply described herein may be configured to supply electrical power specified as voltage or current. Hence, any electrical power source described herein as a voltage source or a current source may be contemplated as an equivalent current source or voltage source, respectively. Similarly, any electrical signal described herein may be specified as a voltage signal or a current signal. Hence, any electrical signal described herein as a voltage signal or a current signal may be contemplated as an equivalent current signal or voltage signal, respectively.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated LIDAR measurement device, comprising:
    an illumination source mounted to a printed circuit board;
    an illumination driver integrated circuit (IC) mounted to the printed circuit board, the illumination driver IC selectively couples the illumination source to an electrical power source in response to a pulse trigger signal, causing the illumination source to emit a measurement pulse of illumination light;
    a photodetector mounted to the printed circuit board, the photodetector configured to detect an amount of return light received by photodetector in response to the measurement pulse of illumination light and generate an output signal indicative of the detected return light; and
    a return signal receiver IC mounted to the printed circuit board, the return signal receiver IC configured to:
        in response to receiving a pulse command signal, generate the pulse trigger signal and communicate the pulse trigger signal to the illumination driver IC;
        receive the output signal during a duration of a measurement window;
        identify one or more return pulses of the detected return light;
        determine a time of flight associated with each of the identified return pulses; and
        determine one or more properties of a segment of each of the identified return pulses.

2. The integrated LIDAR measurement device of claim 1, wherein the return signal receiver IC includes a return signal analysis module, wherein the return signal analysis module comprises:
    a constant fraction discriminator module having a first input node, a second input node, and an output node, wherein the output signal is received on the first input node, and wherein a hit signal at the output node switches to a different value when the output signal exceeds a threshold voltage value on the second input node.

3. The integrated LIDAR measurement device of claim 2, wherein the return signal analysis module further comprises:
    a coarse timing module having a first input node coupled to the output node of the constant fraction discriminator, a second input node, and an output node, wherein the pulse trigger signal is present on the second input node, and wherein the coarse timing module generates a digital value at the output node indicative of a time elapsed between a transition of the pulse trigger signal and a transition of the hit signal.

4. The integrated LIDAR measurement device of claim 3, wherein the digital value is a count of a number of transitions of a digital clock signal that occur between the transition of the pulse trigger signal and the transition of the hit signal.

5. The integrated LIDAR measurement device of claim 4, wherein the return signal analysis module further comprises:
a fine timing module having a first input node, a first output node, and a second output node, wherein the hit signal is present on the first input node, wherein the fine timing module generates a first electrical signal at the first output node indicative of a time difference between the transition of the hit signal and a subsequent transition of the digital clock signal and a second electrical signal at the second output node indicative of a time difference between the transition of the digital hit signal and a subsequent transition of an inverse of the digital clock signal.

6. The integrated LIDAR measurement device of claim 4, wherein the coarse timing module generates a metastability signal, wherein the metastability signal is the digital clock signal shifted by half of a period of the digital clock signal.

7. The integrated LIDAR measurement device of claim 6, further comprising:
a time of flight module configured to estimate a value of a time of flight of the measurement pulse of illumination light based at least in part on the digital value indicative of the time elapsed between the transition of the pulse trigger signal and the transition of the hit signal, the time difference between the transition of the hit signal and the subsequent transition of the digital clock signal, the time difference between the transition of the hit signal and the subsequent transition of the inverse of the digital clock signal, and the metastability signal.

8. The integrated LIDAR measurement device of claim 2, the return signal analysis module further comprising:
a pulse width detection module including:
a first input node, the hit signal present on the first input node,
a second input node, an enable signal present on the second input node, and
an output node, wherein the pulse width detection module generates an electrical signal at the output node that is indicative of a time difference between a transition of the enable signal and a time when an amplitude of the hit signal falls below a threshold value.

9. The integrated LIDAR measurement device of claim 2, the return signal analysis module further comprising:
a return pulse sample and hold module configured to generate an output signal indicative of a peak amplitude of the output signal after the transition of the hit signal.

10. The integrated LIDAR measurement device of claim 9, wherein the return pulse sample and hold module is further configured to generate a plurality of output signal values each indicative of the amplitude of the output signal before and after the peak amplitude.

11. The integrated LIDAR measurement device of claim 10, wherein the number of output signal samples before and after the peak amplitude is programmable.

12. The integrated LIDAR measurement device of claim 1, wherein a first of the one or more return pulses of the detected return light is due to optical crosstalk between the illumination source and the photodetector, and wherein the time of flight associated with each subsequent return pulse of the one or more return pulses is determined with reference to the first return pulse.

13. The integrated LIDAR measurement device of claim 1, wherein the duration of the measurement window is approximately a time of flight of light from the LIDAR measurement device to a maximum range of the LIDAR measurement device and back to the LIDAR measurement device.

14. A method comprising:
receiving, by a return signal receiver integrated circuit (IC) mounted to a printed circuit board, a pulse command signal;
generating, by the return signal receiver IC, a pulse trigger signal in response to receiving the pulse command signal;
communicating, by the return signal receiver IC, the pulse trigger signal to an illumination driver IC mounted to the printed circuit board, the pulse trigger signal configured to cause the illumination driver IC to selectively electrically couple an illumination source to an electrical power source, causing the illumination source to emit a measurement pulse of illumination light;
receiving, by the return signal receiver IC, during a duration of a measurement window, from a photodetector mounted to the printed circuit board, an output signal indicative of a detected amount of return light received by the photodetector in response to the measurement pulse of illumination light;
identifying, by the return signal receiver IC, one or more return pulses of the detected return light;
determining, by the return signal receiver IC, a time of flight associated with each of the identified return pulses; and
determining, by the return signal receiver IC, one or more properties of a segment of each of the identified return pulses.

15. The method of claim 14, further comprising:
generating a hit signal that switches to a different value when the output signal exceeds a threshold voltage value; and
generating a digital value indicative of a time elapsed between a transition of the pulse trigger signal and a transition of the hit signal, wherein the digital value is a count of a number of transitions of a digital clock signal that occur between the transition of the pulse trigger signal and the transition of the hit signal.

16. The method of claim 15, further comprising:
generating a first electrical signal indicative of a time difference between the transition of the hit signal and a subsequent transition of the digital clock signal and a second electrical signal indicative of a time difference between the transition of the digital hit signal and a subsequent transition of an inverse of the digital clock signal; and
generating a metastability signal, wherein the metastability signal is the digital clock signal shifted by half of a period of the digital clock signal.

17. The method of claim 16, further comprising:
estimating a value of a time of flight of the measurement pulse of illumination light based at least in part on the digital value indicative of the time elapsed between the transition of the pulse trigger signal and the transition of the hit signal, the time difference between the transition of the hit signal and the subsequent transition of the digital clock signal, the time difference between the transition of the hit signal and the subsequent transition of the inverse of the digital clock signal, and the metastability signal.

18. The method of claim 15, further comprising:
generating an electrical signal indicative of a time difference between a transition of an enable signal and a time when an amplitude of the hit signal falls below a threshold value.

19. The method of claim 15, further comprising:
generating an output signal indicative of a peak amplitude of the output signal after the transition of the hit signal.

20. The method of claim 19, further comprising:
generating a plurality of output signal values each indicative of the amplitude of the output signal before and after the peak amplitude, wherein the number of output signal samples before and after the peak amplitude is programmable.

21. An integrated LIDAR measurement device, comprising:
an illumination source mounted to a printed circuit board;
an illumination driver integrated circuit (IC) mounted to the printed circuit board, the illumination driver IC selectively couples the illumination source to an electrical power source in response to a pulse trigger signal, causing the illumination source to emit a measurement pulse of illumination light;
a photodetector mounted to the printed circuit board, the photodetector configured to detect a first amount of the measurement pulse of illumination light due to crosstalk between the illumination source and the photodetector and a return pulse of light reflected from a location in a surrounding environment illuminated by a second amount of the measurement pulse; and
a return pulse receiver IC mounted to the printed circuit board, the return pulse receiver IC configured to:
in response to receiving a pulse command signal, generate the pulse trigger signal and communicate the pulse trigger signal to the illumination driver IC; and
estimate a time between an instance when the first amount of the measurement pulse of illumination light due to crosstalk is detected and an instance when the valid return pulse of light is detected.

* * * * *